INVENTOR.
James M. Carter

008# United States Patent Office 2,737,439
Patented Mar. 6, 1956

2,737,439
CYCLIC PROCESSES OF PRODUCING $UCl_6$

James M. Carter, Pasadena, Calif., assignor to the United States of America as represented by the United States Atomic Energy Commission Application November 16, 1943, Serial No. 510,558

11 Claims. (Cl. 23—14.5)

The present invention relates to cyclic processes of producing $UCl_6$, and more particularly to such processes wherein $UCl_5$ is decomposed into $UCl_4$ and $UCl_6$ and the $UCl_4$ is then converted into $UCl_5$ to be recycled.

In the production of $UCl_6$ employing the process disclosed in U. S. Patent No. 2,572,156, issued to Francis A. Jenkins on October 23, 1951, a charge of $UCl_5$ is decomposed in a molecular still, whereby $UCl_6$ is produced as a sublimate and $UCl_4$ is produced as a residue. This residue of $UCl_4$ constitutes a by-product and is produced in an amount equivalent to approximately 45.7% of the charge of $UCl_5$.

Accordingly, it is an object of the present invention to provide a process of producing $UCl_6$ in which the by-product $UCl_4$ is recycled.

Another object of the invention is to provide a process of producing $UCl_6$ wherein $UCl_5$ is decomposed into $UCl_4$ and $UCl_6$ and the $UCl_4$ is converted directly into $UCl_5$ to be recycled.

Another object of the invention is to provide a process of producing $UCl_6$, wherein $UCl_5$ is decomposed into $UCl_4$ and $UCl_6$ and the $UCl_4$ is converted into uranium oxychloride, which in turn is converted into $UCl_5$ to be recycled.

A further object of the invention is to provide an improved process of producing uranium pentachloride which includes preparing an arbitrary mixture of uranium trioxide, $UO_3$, and uranium oxychloride and reacting the mixture with $CCl_4$.

A further object of the invention is to provide a process of producing uranium oxychloride in which $UCl_4$ is reacted with dry air at an elevated temperature.

Figure 1:
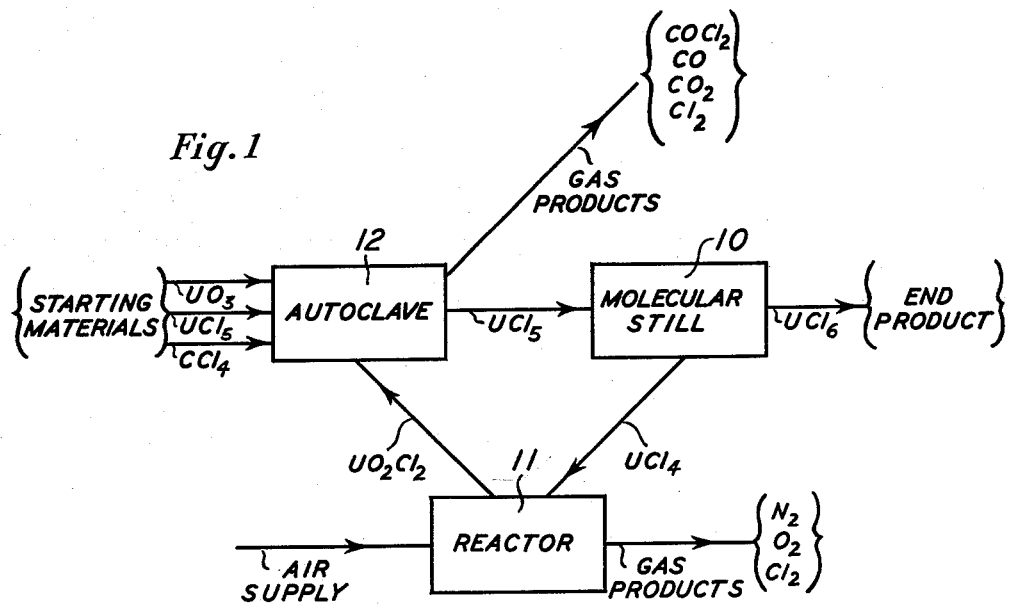
Figure 2:
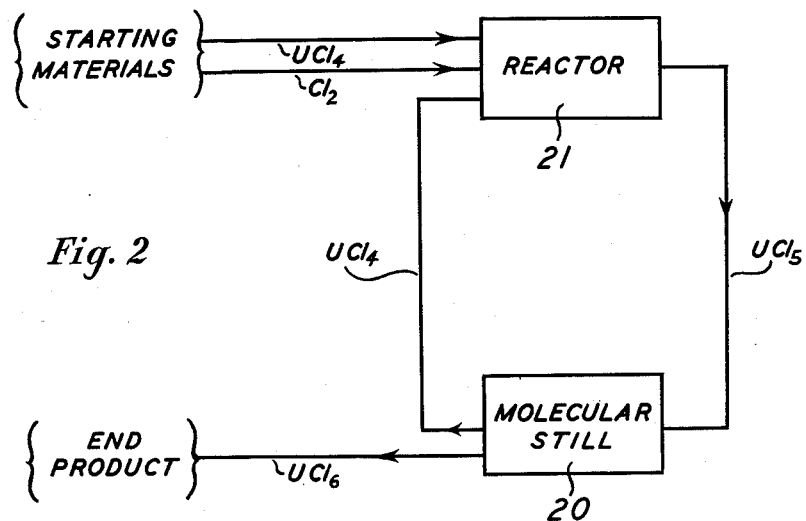

The invention, both as to its organization and method of operation, together with further objects and advantages thereof, will best be understood by reference to the following specification taken in connection with the accompanying drawing, in which Figure 1 is a flow diagram of a cyclic process of producing $UCl_6$ embodying the present invention, and Fig. 2 is a flow diagram of a modified form of the cyclic process of producing $UCl_6$.

In accordance with the present invention, $UCl_5$ is first decomposed into $UCl_4$ and $UCl_6$ in the manner disclosed in the previously mentioned Jenkins application. More particularly, a suitable charge of $UCl_5$ is placed in a molecular still and subjected to a vacuum heating operation, the charge being heated to a temperature within the range 80° to 180° C. and subjected to a reduced pressure between $10^{-6}$ and $10^{-3}$ mm. of Hg. When the charge of $UCl_5$ is so treated, it is broken down into $UCl_4$ and $UCl_6$, the $UCl_4$ remaining as a residue and the $UCl_6$ being sublimed. This decomposition of the $UCl_5$ takes place substantially quantitatively and may be written as follows:

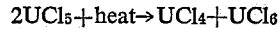

This treatment normally requires approximately three hours under the conditions mentioned employing a charge of 100 grams of $UCl_5$, whereby the charge of 100 grams of $UCl_5$ is converted into approximately 45.7 grams of $UCl_4$ and 54.3 grams of $UCl_6$. This treatment is continued until substantially all of the $UCl_5$ is broken down; thereafter the residue of $UCl_4$ and the sublimate of $UCl_6$ are separately collected. In the present process the $UCl_6$ constitutes the end-product, while the $UCl_4$ constitutes a by-product. The $UCl_6$ thus produced is then bottled in an atmosphere of $CO_2$ or in a vacuum for future use, while the $UCl_4$ thus produced is subjected to further treatment, as explained below.

The $UCl_4$ produced as a by-product in the molecular still, as explained above, is then ground into a finely divided state and placed in a suitable reactor, the $UCl_4$ being of very fine-grained crystalline structure. In the reactor, the $UCl_4$ is heated to a temperature within the range 300° to 350° C. in a stream of dry air. Preferably the stream of air is passed through a suitable drier such, for example, as a $H_2SO_4$ bubbler, in order to render it substantially completely free of water vapor. When the $UCl_4$ is heated to the elevated temperature mentioned in the presence of the stream of dry air, it is reacted by oxidation, whereby the oxychloride of uranium, $UO_2Cl_2$, is produced in crystalline form. The reaction of the $UCl_4$ and the oxygen in the stream of dry air is substantially quantitative and may be written as follows:

This reaction of the $UCl_4$ is continued until it is substantially entirely converted to $UO_2Cl_2$, which may be carried out ordinarily in fifteen or twenty minutes under the conditions mentioned. The $UO_2Cl_2$ is then collected and subjected to further treatment, as explained below.

The $UO_2Cl_2$ produced in the reactor, as explained above, is then reacted in an autoclave and converted to $UCl_5$ in a manner substantially identical to that disclosed in the copending application of Ernest C. Evers and Charles J. Carignan, Serial No. 557,544, filed October 6, 1944. More particularly, a dry charge is prepared comprising the $UO_2Cl_2$ alone or admixed with a suitable quantity of $UO_3$, as makeup material. In the event an admixture of $UO_2Cl_2$ and $UO_3$ is employed, it is arbitrary and without particular reference to proportion. The charge so prepared is then placed in the autoclave, this charge comprising, for example, 1500 grams of the mixture of $UO_2Cl_2$ and $UO_3$, 200 grams of $UCl_5$, and 3700 cc. of $CCl_4$ (representing approximately 150% excess of $CCl_4$). The autoclave is closed and the charge is heated directly to 120° C. in an appropriate time interval; after this temperature is held for a time of one-half hour the charge is further heated in order to cause the temperature thereof to be raised progressively to 160° C. More particularly, the temperature of the charge is raised from 120° to 140° C. in one and one-half hours and then from 140° to 160° C. in one and one-fourth hours. Finally, the temperature of the charge is held at 160° C. for one-half hour, whereby the total time of heating the charge above 120° C. is three and three-fourths hours. Throughout the reaction the pressure is kept sufficiently high to maintain carbon tetrachloride in liquid phase in the reaction zone. The head pressure over the charge is then relieved, the excess $CCl_4$ is evaporated, and the product is subjected to vacuum and heat in order to substantially completely remove any $CCl_4$ and $COCl_2$ entrapped therein. When the charge is thus treated, the $UO_3$ and the $UO_2Cl_2$ are converted substantially quantitatively into $UCl_5$, and the reactions may be written as follows:

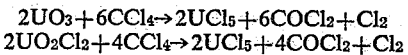

For example, in the event the charge of 1500 grams of the mixture of $UO_3$ and $UO_2Cl_2$ comprises substantially equal parts of the two compounds mentioned, approximately 2000 grams of $UCl_5$ are produced.

After the charge is thus reacted in the autoclave to produce $UCl_5$ in the manner explained above, it is removed and transferred to the molecular still, whereby it is again decomposed into UCl4 and UCl6, as previously explained. This cycle of the individual steps described above may be repeated any number of times, whereby the required quantity of UCl6 is produced in batches and the UCl4 produced as a by-product incident to each batch of UCl6 is re-worked.

Referring now more particularly to Fig. 1 of the drawing, it will be observed that the entire cyclic process may be carried out in apparatus comprising a molecular still 10, a reactor 11, and an autoclave 12. In carrying out the present process the UCl5 placed in the molecular still 10 is decomposed into the end-product, UCl6, and the by-product, UCl4, as indicated. The UCl4 is then transferred to the reactor 11 and is reacted with oxygen to produce UO2Cl2, as indicated. Finally, the autoclave 12 is provided with a charge comprising the UO2Cl2, UO3, UCl5, and CCl4, which charge is reacted to produce UCl5 and the gas products COCl2, CO, CO2, and Cl2, the gas products being discharged, as indicated.

In a modified form of the cyclic process, UCl5 is first decomposed into UCl4 and UCl6 in the manner disclosed in the previously mentioned Jenkins application. More particularly, a suitable charge of UCl5 is placed in a molecular still and treated in the manner previously described, whereby the desired end-product, UCl6, is produced as a sublimate, and the by-product, UCl4, is produced as a residue.

The UCl4 produced as a by-product in the molecular still, as explained above, is collected and ground into a finely-divided state, and then converted directly into UCl5, in the manner disclosed in the abandoned application of Horace R. McCombie, Serial No. 506,336, filed October 15, 1943, an abstract of which was printed in the Official Gazette of February 26, 1952.

More particularly, this UCl4 is mixed with make-up UCl4, produced in any suitable manner, the mixture being arbitrary and without particular reference to proportion, to produce a total charge of UCl4 which is placed in a suitable reactor. The charge of UCl4 in the reactor is heated to a temperature within the range 520° to 550° C. in a dry stream of chlorine. For example, when a charge of 500 grams of UCl4 is treated in the manner explained above for approximately seven hours, it is converted substantially quantitatively into approximately 546 grams of UCl5, and the reaction may be written as follows:

$$2UCl_4 + Cl_2 \rightarrow 2UCl_5$$

After the charge is thus reacted in the reactor to produce UCl5 in the manner explained above, it is removed and transferred to the molecular still, whereby it is again decomposed into UCl4 and UCl6, as previously explained. This cycle of the individual steps described above may be repeated any number of times, whereby the required quantity of UCl6 is produced in batches and the UCl4 produced as a by-product incident to each batch of UCl6 is re-worked.

Referring now more particularly to Fig. 2 of the drawing, it will be observed that this modified form of the entire cyclic process may be carried out in apparatus comprising a molecular still 20 and a reactor 21. In carrying out the present process, the UCl5 placed in the molecular still 20 is decomposed into the end-product UCl6, and the by-product UCl4, as indicated. Then the reactor 21 is provided with a charge comprising the UCl4 taken from the molecular still 20 and additional UCl4 produced in any desired manner, which charge is reacted with Cl2 to produce UCl5, as indicated.

In carrying out this modified form of the cyclic process of producing UCl6, the additional UCl4 which is required for make-up purposes in the reactor 21 may be made in any suitable manner, as previously noted. However, it is preferable that this UCl4 be made in accordance with the process disclosed in U. S. Patent No. 2,677,592 issued to James M. Carter on May 4, 1954. As disclosed in the Carter application, a charge of 600 grams of UO2 is reacted with the required amount of CCl4, whereby it is converted substantially quantitatively into 844 grams of UCl4. In this process, the charge of UO2 is heated in a suitable reactor to a temperature within the range 425° to 475° C., and contacted with a stream of CCl4 vapor heated to a temperature of the order 500° C., the reaction requiring approximately four and one-half hours.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. The process of producing UCl6 comprising converting UCl5 into UCl6 and UCl4, converting the UCl4 into a uranium oxychloride by reaction with a dry air stream, converting the uranium oxychloride into UCl5, and then repeating the cycle employing the UCl5 thus obtained.

2. The process of producing UCl6 comprising converting UCl5 into UCl6 and UCl4, converting the UCl4 into UO2Cl2 by reaction with a dry air stream, converting the UO2Cl2 into UCl5, and then repeating the cycle employing the UCl5 thus obtained.

3. The process of producing UCl6 comprising converting a charge including a uranium oxychloride and another uranium compound into UCl5, converting the UCl5 into UCl6 and UCl4, converting the UCl4 into a uranium oxychloride by reaction with a dry air stream, adding to the uranium oxychloride thus obtained sufficient of said other uranium compound to produce another charge adapted for conversion to UCl5, and then repeating the cycle employing the last-mentioned charge.

4. The process of producing UCl6 comprising converting a charge including a uranium oxychloride and UO3 into UCl5, converting the UCl5 into UCl6 and UCl4, converting the UCl4 into a uranium oxychloride by reaction with a dry air stream adding to the uranium oxychloride thus obtained sufficient UO3 to produce another charge adapted for conversion to UCl5, and then repeating the cycle employing the last-mentioned charge.

5. The process of producing a uranium oxychloride comprising reacting UCl4 and dry air at an elevated temperature.

6. The process of producing a uranium oxychloride comprising heating UCl4 to an elevated temperature in a stream of dry air.

7. The process of producing a uranium oxychloride comprising heating UCl4 to a temperature within the range 300 to 350° C. in a stream of dry air.

8. The process of producing UO2Cl2 comprising reacting UCl4 and dry air at an elevated temperature.

9. In a cyclic process for producing UCl6, the steps comprising converting UCl5 into UCl6 and UCl4, converting the UCl4 into a uranium oxychloride by reaction with oxygen at an elevated temperature, converting the uranium oxychloride into UCl5 and then repeating the cycle employing the UCl5 thus obtained.

10. In a cyclic process for producing UCl6, the steps comprising converting UCl5 into UCl6 and UCl4, converting the UCl4 into a uranium oxychloride by reaction with oxygen at a temperature within the approximate range of 300° to 350° C., converting the uranium oxychloride into UCl5 and then repeating the cycle employing the UCl5 thus obtained.

11. The process of producing uranium oxychloride comprising reacting UCl4 and dry gaseous oxygen at an elevated temperature.

References Cited in the file of this patent

Mellor: "Comprehensive Treatise on Inorganic and Theoretical Chemistry," vol. XII, 1932, pages 83, 84, and 86.